Dec. 5, 1939.  I. I. BORNSTEIN  2,182,195
DEVICE FOR MEASURING BEER IN A BARREL
Filed Dec. 31, 1934
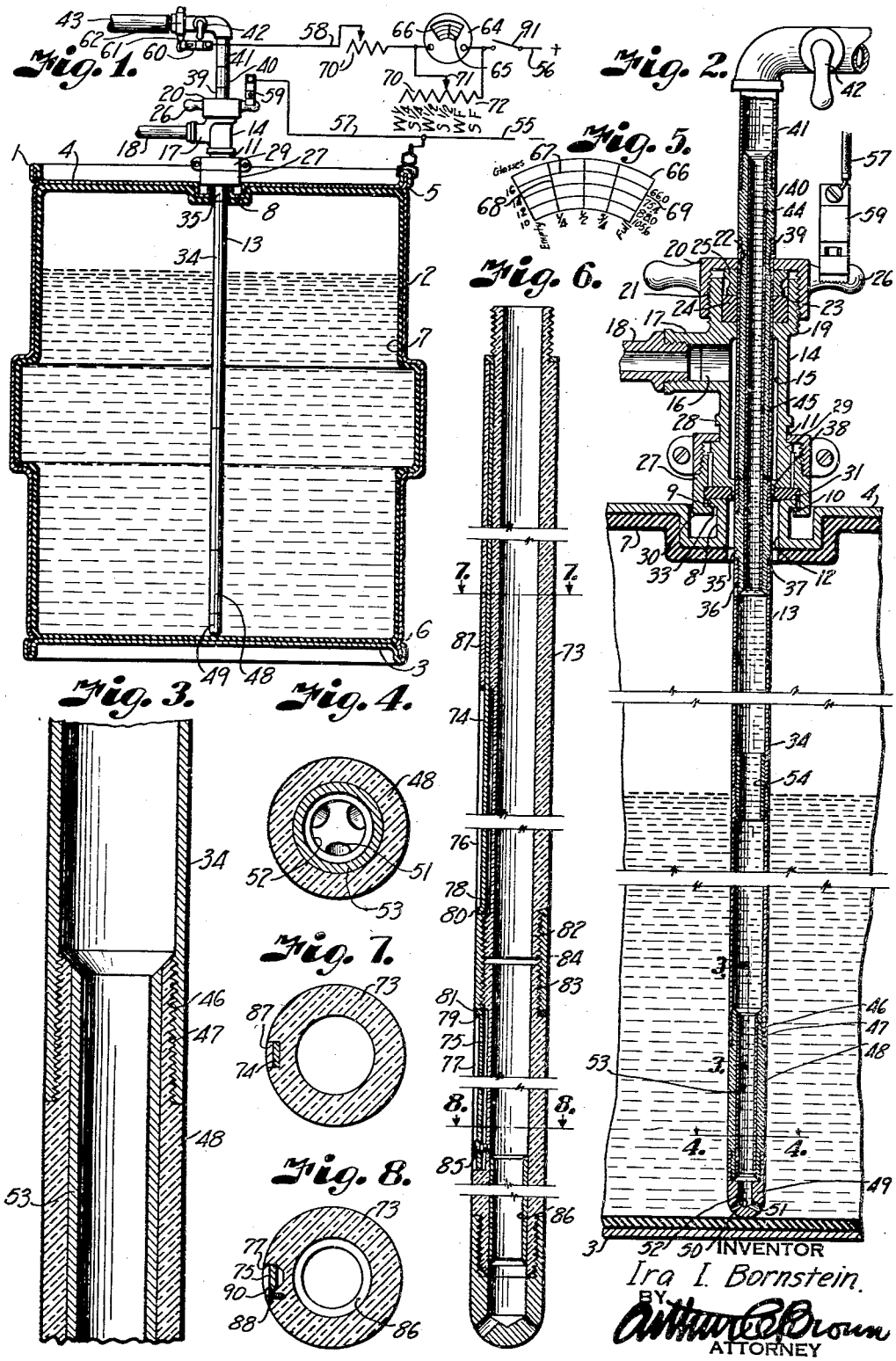
INVENTOR
Ira I. Bornstein.
BY Arthur C. Brown
ATTORNEY Patented Dec. 5, 1939

2,182,195

UNITED STATES PATENT OFFICE 2,182,195

DEVICE FOR MEASURING BEER IN A BARREL

Ira I. Bornstein, Kansas City, Mo.

Application December 31, 1934, Serial No. 759,897

5 Claims. (Cl. 201—48)

This invention relates to a device for measuring beer in a barrel. Due to the foamy and gaseous nature of beer, it is difficult to determine with any degree of accuracy the amount of beer dispensed from or remaining in a barrel.

It is, therefore, a principal object of the present invention to provide for accurately measuring the beer remaining in a barrel and to check the quantity dispensed over given periods of time.

It is also an object of the present invention to adapt the apparatus for measuring liquids such as beer in any one of the standard size barrels whether wood or steel.

In accomplishing these and other objects of the invention, I have provided improved details of structure, the preferred forms of which are illustrated in the accompanying drawing, wherein:

Fig. 1 is a vertical section through a beer barrel equipped with a measuring apparatus constructed in accordance with the present invention.

Fig. 2 is an enlarged vertical section through the tapping rod which forms one of the electrodes of an electric circuit used in measuring the amount of beer in the barrel.

Fig. 3 is an enlarged longitudinal section through a portion of the tapping rod on the line 3—3, Fig. 2.

Fig. 4 is an enlarged cross section on the line 4—4, Fig. 2.

Fig. 5 is a plan view of the indicator scale.

Fig. 6 is a vertical section through a modified form of tapping rod.

Fig. 7 is a cross section through the modified form of tapping rod on the line 7—7, Fig. 6.

Fig. 8 is a similar section on the line 8—8, Fig. 6.

Referring more in detail to the drawing:

1 designates a barrel for containing beer and in the illustrated instance includes a cylindrical metal wall 2 having heads 3 and 4 connected with the ends of the wall 2 to form chimes 5 and 6 as in conventional practice. The barrel 1 is lined with pitch 7 to protect the metal of which the barrel is constructed from action of the beer and in case of wood barrels to prevent soaking of the beer into the wood.

Formed in the head 4 is a draft connection of standard design including an inset neck 8 having laterally extending ears 9 and 10 to anchor a draft fitting 11 which seals the draw-off opening 12 around the tapping rod 13.

The draft fitting 11 includes a T-shaped body 14 having a vertical bore 15 to slidably pass the tapping rod 13, the bore 15 being intersected by a bore 16 that is formed in a lateral neck 17 of the T-fitting to connect a pressure supply line 18 through which a gas such as air or carbon dioxide is passed into the barrel for displacing the beer through the tapping rod and through a cooling coil (not shown). Formed on the upper end of the T-shaped body is a threaded neck 19 for mounting a packing cap 20 having internal threads 21 for engaging the threads of the neck 19 and having a central opening 22 aligning with the bore 15.

Formed within the neck 19 is a counter-bore 23 to seat a packing ring 24 that is pressed into sealing engagement with the tapping rod and into seating engagement with the bottom of the counterbore by means of a follower 25 sleeved on the tapping rod and movable upon rotation of the packing cap 20. In order to facilitate rotation of the packing cap, it is provided with a plurality of radially extending arms 26 which form one of the connections of an electric circuit as hereinafter described. The opposite end of the fitting rotatably mounts a draw nut 27 which is retained between spaced collars 28 and 29 and carries a packing supporting ring 30 to seat a compressible gasket 31 against the inset neck 8. The ring 30 has an inwardly extending flange 33 provided with notches for passing the ears 9 and 10 so that when the fitting is rotated a partial turn about the tapping rod, the ears 9 and 10 interlock with the flange 33 to compress the gasket ring between the neck of the draft connection and the adjacent end of the draft fitting, thereby sealing the opening 12 against leakage of gas or liquid through the draft connection.

The construction thus far described, with the exception of the tapping rod, is conventional to beer drawing equipment and specifically forms no part of the present invention. The tapping rod 13, however, is constructed in such a manner that it provides an electrode by which an electric current flow is caused to pass through the beer in the barrel, the barrel constituting the opposite polarity of the circuit.

The tapping rod is best illustrated in Figs. 2, 3 and 4 and includes a metallic section 34 adapted to be immersed within the beer in the barrel and which is insulated from direct contact with the body of the barrel by means of an insulating nipple 35 that is screwed into the upper end of the section 34 at the point where the tapping rod passes through the draft connection.

In the illustrated instance, the insulated nipple 35 has a threaded lower end 36 of reduced diameter to form a shoulder 37 which seats against the end of the section 34 when the lower end is threaded into the internally threaded upper end thereof to form a liquid and gas tight joint therebetween. The opposite end 38 of the nipple is also provided with a reduced externally threaded neck to threadedly engage the similar end of a tubular section 39 that extends through the draft fitting 11.

The metallic section 39 projects from the opening 22 in the packing cap and mounts a similar nipple 40 which in turn couples the draw-off connection 41. The draw-off connection 41 includes the usual L-shaped cock 42 which is connected with the usual cooling coil (not shown) by means of a flexible tube 43 as in ordinary practice.

In order to complete an electric circuit from the section 34, a metallic tube 44 extends axially through the metallic section 39 and has its ends mounted in the bore of the nipples 35 and 40.

In order to reinforce the tapping rod at the point where it passes through the draft fitting, an insulating tube 45 is sleeved in the space between the inner and outer metal tubes and has its ends sealingly engaging against the adjacent ends of the nipples as clearly illustrated in Fig. 2. The insulating tube thus closes the space between the metallic tubes and prevents the entrance of liquid or gas that might tend to short circuit the respective tubes. The lower end of the section 34 is internally threaded as at 46 to threadedly engage the externally threaded neck 47 of an insulating section 48 forming a continuation of the lower end of the draft rod and which carries a metallic inlet fitting 49 engaging against the pitch lining at the bottom end of the barrel. The inlet fitting 49 conforms in diameter to the other sections of the tapping rod and has a rounded lower end 50 provided with radial ports 51 communicating with a bore 52 therein which connects with the interior of the insulating tube 48. To complete the electric circuit through the tapping rod at the bottom of the barrel, the insulating section 48 is provided with an inner metallic tube 53 extending the full length thereof.

The tapping rod thus described is suitable for full sized barrels and in order to adapt the tube to smaller size barrels whether wood or steel, the metallic tubular section 34 is preferably jointed and connected together by an internally threaded nipple 54 in order that it may readily pass through the bore of the draft fitting 11.

55 and 56 designate the line wires of an electric circuit including conductors 57 and 58 having flexible leads equipped with clamp terminals 59 and 60 of any standard construction to respectively engage one of the arms 26 on the packing cap 29 and a similar arm 61 on a nut 62 which threadedly connects the tube 43 with the draft cock 42.

Located in the line 56 which supplies the current to the tapping rod is an indicator 64 constructed in the same manner as an ordinary millimeter of a predetermined range. The pointer or hand 65 thereof, however, moves over an arcuate scale 66 including concentric arcs 67, each representing glasses of ten to sixteen ounce capacities and radial graduations 68 extending across the lines representing the number of glasses contained in a barrel of beer, or any portion thereof.

Attention is particularly directed to the insulated section at the lower end of the tapping rod as this forms a most important function in accurate measurement of the current as controlled by the electrical conductivity of the beer between the tapping rod and barrel. For example, when the level of the beer in the barrel approaches the bottom thereof, current flow increases because the electrical flow seeks the path of least resistance. If the metallic section 34 were carried to the bottom of the barrel, the beer would not control reading of the meter since an electrical flow would be established from the tapping rod to the nearest point of the barrel, which would be the bottom thereof.

In order, therefore, to insure that the electrical flow is directed through the entire volume of beer remaining in the barrel, as the depth thereof becomes less than the distance from the tapping rod to the cylindrical wall 2, I employ the insulated section which insulates the lower end of the rod from contact with the beer in the bottom of the barrel. Consequently, flow which would normally be established through the beer at this point is diverted through the body of the beer around the point of insulation to the inlet fitting 49 and the entire body of beer remaining in the barrel therefore becomes effective.

When the device is used on other sized barrels, it is necessary to provide means for regulating the maximum current flow so that the pointer 65 will register with the full mark 69 on the scale. This is accomplished by connecting a variable resistance 70 in shunt relation with the indicator 64, the resistance including a movable contact arm 71 adapted to engage selective points on the coil which are marked to designate the size and type of the barrel as indicated at 72, i. e., wood or steel ¼, ½, or full barrel. A variable resistance 70' is placed in series with the indicator 64 so as to dampen creeping tendency of the current to rise above the full barrel indication when the barrel is full.

In Figs. 6, 7 and 8 is illustrated a modified form of tapping rod 73 wherein the main body of the tapping rod is constructed of insulating material that is not affected by the chemical action of the beer and the electrical contact is made with the beer through metal strips of iron, brass or other conducting material 74 and 75 that are inset in grooves 76 and 77 formed longitudinally of the respective joints of the tapping rod.

The strips have their adjacent ends 78 and 79 making electric contact with metallic gasket washers 80 and 81 that are sleeved over the threaded necks 82 and 83 of the sections to engage against the ends of a metallic coupling sleeve 84 connecting the sections. The ends of the necks 82 and 83 are of sufficient length that they abut against each other to prevent contact of the beer with the inner surface of the metal coupling sleeve 84.

The lower end of the contact 77 has electrical connection with a screw 85 which extends through the wall of the tube and contacts with the beer moving therethrough. The lower end of the tapping rod is substantially identical to the insulated end of the tapping rod in the preferred form of the invention with the inner tube 86 terminating in spaced relation with the screw 85 to complete electrical circuit therethrough in the same manner as the electric circuit is completed through the column of beer moving through the tube in the preferred form.

In order to insure insulation of the contact strip 74 where it extends through the draft fitting, the groove is inlaid with an insulating strip 75

87 on top of the contact strip as best illustrated in Fig. 6.

To assure positive support of the contact strips within the respective grooves, I provide screws 88 which are threaded into the rod adjacent the side edges of the strips and having heads 90 engaging over the outer face of the strips as best illustrated in Fig. 8.

In using a tapping rod constructed and assembled as described, the tapping rod is withdrawn through the draft fitting to allow the coupling 27 to be coupled to the neck 8 of the barrel.

The packing nut is then tightened about the tapping rod and the tapping rod is driven down into the barrel to displace the plug (not shown) which has closed the opening 12. The tapping rod is projected into the barrel until the inlet end 49 thereof seats against the material 7 covering the bottom of the barrel.

The pressure and coil connections 18 and 43 are then connected to the tapping rod as in conventional practice, after which the contact clips 59 and 60 are clamped to the respective handles 26 and 61.

The switch 91 is then closed so that a current flows through series damping resistance 70' and through the meter 64 in proportion to the parallel resistance 70 to contact 60, arm 61, cock 42, metallic section 41 through the beer within the tapping tube to the inner metallic conductor tube 44, across the beer to the tubular section 34, across the botom end of the section to the inner tube 53 and again across the beer to the inlet fitting 49 establishing an electric charge along the length of the tapping rod.

In a similar manner an oposite charge is established on the wall of the barrel by current flow through the line 55, conductor 57, contact 59, arm 26, draft fitting 11 and coupling 27 to the barrel head.

It is thus apparent that the beer contacting the tapping rod forms a path for discharge of current thereacross, the flow of which is registered on the indicator 64.

The contact arm 71 of the variable resistance is adjusted to the marking indicating the size of the barrel, for example in the barrel illustrated to the point designated "F. S." which stands for a full size steel barrel. If the barrel is of wood, the pointer 71 is brought to the contact designated "F. W.", or full size wood barrel.

In order to assure better contact with the barrel, I preferably provide a secondary contact which is connected to the conductor 57 and clamped to the chime of the barrel. This clamp is also used in case of a wood barrel to establish an electrical charge on the hoops.

In the case of a wood barrel, the moisture within the wood is sufficient to complete the flow of a current between the hoops. The hoops, however, can be connected by a suitable conductor, but in most instances such is not necessary as there is sufficient conductivity in the saturated wood to effect accurate operation of the indicator.

As the level drops in the barrel, the pointer will move across the scale toward the empty side thereof indicating the number of glasses drawn from the barrel, the scale being selected in accordance with the size of glasses used and which is designated by the numbers "10", "12", "14", and "16" at the left hand side of the scale.

As the depth of the beer in the barrel becomes less than the distance of the tapping rod from the wall of the barrel, there is less resistance to the electrical flow through the metal tip toward the bottom of the barrel which would ordinarily effect accuracy of the indicator; however, since the effective contact or charge area of the tube is reduced incidental to the insulating section, the electric discharge is lessened in proportion to the reduced resistance so as to maintain the same relative reading on the indicator as the reading on the upper end of the scale.

The tapping rod illustrated in Figs. 6, 7 and 8 operates in identically the same manner as the tapping rod illustrated in the preferred form of the invention except that the flow of current at the upper end of the tapping rod is not established through the flowing column of beer. In this construction the flow of current is through the strip 74 to the tubular section 41.

When the tapping rod is to be used on one-half and one-quarter size barrels of wood or steel, the lower joint of the tubular section 34 is uncoupled from the upper joint and the upper joint is unscrewed from the insulating nipple 35. The lower section is then screwed onto the nipple 35 which effects shortening of the rod. In order to maintain the draft connections at the same level regardless of the size of the barrel, the removed section can be coupled into the tapping rod between the upper insulating nipple 40 and the metallic section 41.

From the foregoing, it is apparent that I have provided a measuring apparatus which may be applied to any conventional type of barrel without in any way altering the construction thereof since the tapping rod is used as an electrode of positive polarity and the body of the barrel as the negative polarity of the measuring circuit.

What I claim and desire to secure by Letters Patent is:

1. In an apparatus for passing a measuring current through beer in a barrel, an electrode comprising a tapping rod including a current conducting section, an insulating section connected with the lower end of the current conducting section, an inlet fitting on the lower end of the insulating section, and an electric conductor in the interior of the insulating section to bridge the insulation between said inlet fitting and the current conducting section.

2. In an apparatus for passing a measuring current through beer in a barrel, an electrode comprising a tapping rod including a current conducting section, an insulating section connected with the lower end of the current conducting section, an inlet fitting on the lower end of the insulating section, an electric conductor in the interior of the insulating section to bridge the insulation between said inlet fitting and the current conducting section, a draft fitting mounted on the rod, and means insulating the draft fitting from the rod.

3. In an apparatus for passing a measuring current through beer in a barrel, an electrode comprising a tapping rod including a metallic current conducting section adapted to be immersed within the beer contained in a beer barrel, an insulating nipple connected with the upper end of the section, a metal section adapted to be engaged by a draft fitting connected with the barrel, an insulating nipple fixed to the upper end of the last named section, an inner metallic tube connecting said nipples for conveying a current from the immersed section through said insulating nipples, and a coil connection connected with the last named nipple.

4. In an apparatus for passing a measuring current through beer in a barrel, an electrode comprising a tapping rod including a metallic current conducting section adapted to be immersed within the beer contained in a beer barrel, an insulating nipple connected with the upper end of the section, a metal section adapted to be engaged by a draft fitting connected with the barrel, an insulating nipple fixed to the upper end of the last named section, an inner metallic tube connecting said nipples for conveying a current from the immersed section through said insulating nipples, a coil connection connected with the last named nipple, an insulator section on the lower end of the immersed section, and a tube in said last named insulator section for conveying current to the immersed section.

5. In an apparatus for passing a measuring current through beer in a barrel, a tapping rod provided with an exterior current conducting portion in contact with the beer contained in the barrel and having an insulating section at the lower end interrupting said exterior current conducting portion, and a current conducting member in said insulating section to cooperate with the exterior current conducting portion to form a continuous conductor coextensive with said rod.

IRA I. BORNSTEIN.